1,550,920

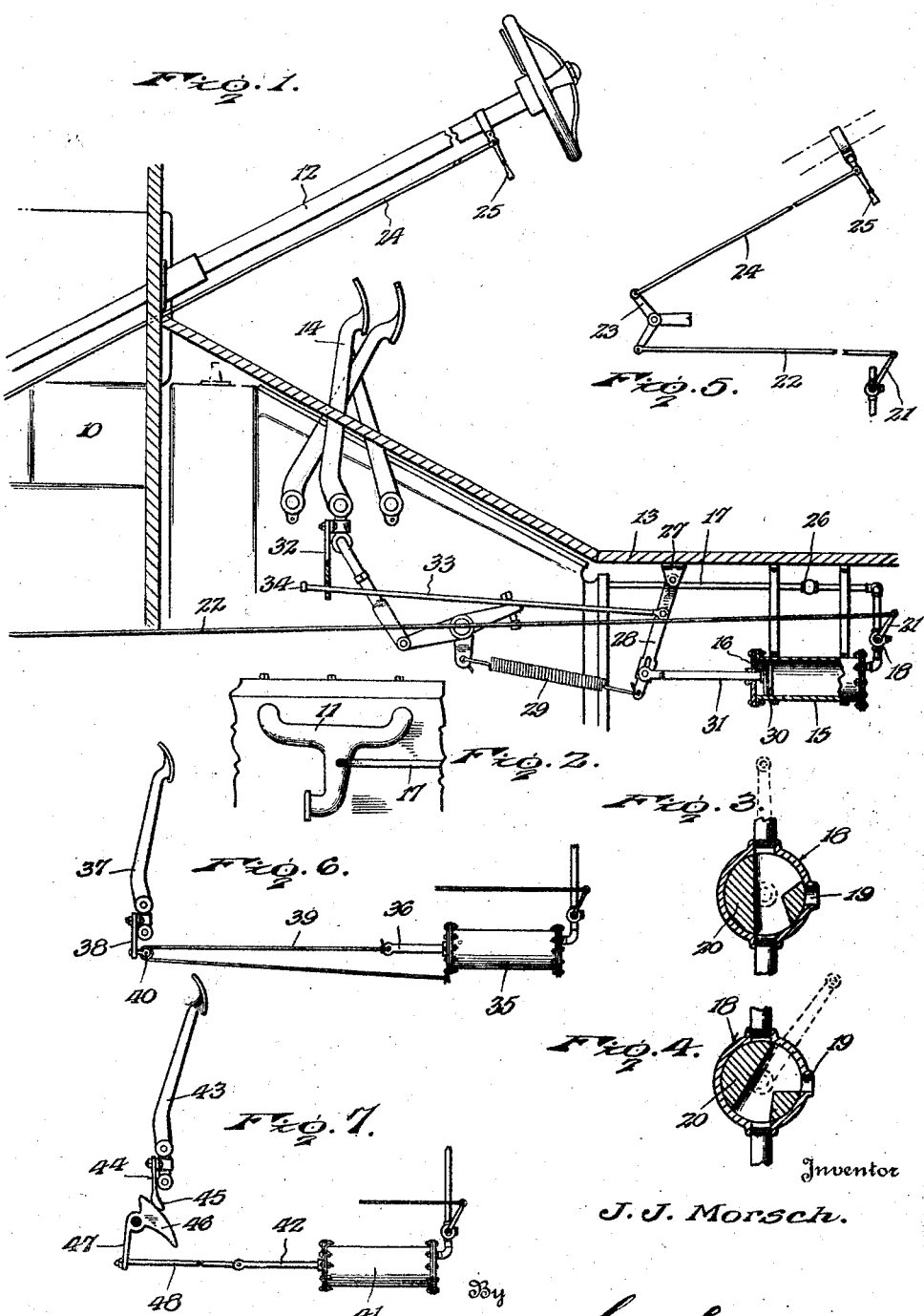
Aug. 25, 1925.
J. J. MORSCH
1,550,920
CLUTCH ACTUATING MECHANISM
Filed Feb. 15, 1924
Inventor
J. J. Morsch.
By Lacy & Lacy, Attorneys Patented Aug. 25, 1925.

UNITED STATES PATENT OFFICE.

JESSE J. MORSCH, OF DOUGLAS, WYOMING.

CLUTCH-ACTUATING MECHANISM.

Application filed February 15, 1924. Serial No. 693,074.

*To all whom it may concern:*

Be it known that I, JESSE J. MORSCH, a citizen of the United States, residing at Douglas, in the county of Converse and State of Wyoming, have invented certain new and useful Improvements in Clutch-Actuating Mechanism, of which the following is a specification.

This invention relates to an improved clutch actuating mechanism for motor vehicles and while being well adapted for general application is, nevertheless, particularly designed for use upon Ford cars.

The invention seeks, as one of its principal objects, to provide a mechanism for rocking the low speed clutch pedal of a Ford vehicle forwardly so as to actuate the low speed clutch and which will also function to hold the pedal in its forward position so as to maintain the low speed gear of the vehicle active and thus relieve the driver of the necessity for pressing against the pedal with the foot.

The invention seeks, as a further object, to provide a mechanism which may be controlled from the driver's seat of the vehicle and without appreciable effort on the part of the driver.

And the invention seeks, as a still further object, to provide a mechanism which may be readily installed.

Other and incidental objects will appear hereinafter.

In the drawings:

Figure 1 is a side elevation showing my improved mechanism applied, parts being illustrated in section, Figure 2 is a detail side elevation showing the manner in which the suction pipe employed is connected to the intake manifold of the vehicle engine, Figures 3 and 4 are detail sectional views showing the two-way valve employed, Figure 5 is a detail elevation showing the hand lever provided for controlling the mechanism, Figure 6 is a detail side elevation showing a slight modification of the invention, and Figure 7 is a detail side elevation showing a further slight modification.

Referring now more particularly to the drawings, I have, for convenience, shown the present mechanism applied. The engine of a Ford vehicle is conventionally illustrated at 10 and the intake manifold of the engine at 11. The steering post is indicated at 12 and the floor at 13, while the low speed clutch pedal of the vehicle is indicated at 14. As is well known, this pedal is movable forwardly for actuating the low speed clutch of the vehicle transmission and rendering the low speed active while the pedal also controls the high speed clutch of the transmission, the pedal being movable rearwardly under the influence of the high speed clutch spring to permit the engagement of the high speed clutch. The pedal thus controls both the low speed and the high speed of the transmission.

Coming now more particularly to the subject of the present invention, I employ a cylinder 15 provided at one end with a vent opening 16 and attached to the cylinder at its opposite end is a suction pipe 17. As shown in detail in Figure 2, this pipe is connected at its forward end to the intake manifold 11 of the vehicle engine so that engine suction in the manifold will be communicated to the pipe. Interposed in said pipe is a two-way valve 18, the casing of which is, as shown in detail in Figures 3 and 4, provided with an air inlet 19. The valve plug is indicated at 20 and, as will be seen, said plug is provided with a passage of such shape that the plug may, as shown in Figure 3, be rotated to one position closing the air inlet 19 while subjecting the cylinder 15 to engine suction or, as shown in Figure 4, may be rotated to another position cutting off engine suction to the cylinder while permitting flow of air through the inlet 19 to the cylinder. Connected with the valve plug is a lever 21 to which is attached a rod 22 extending forwardly to a point near the lower end of the steering post of the vehicle and mounted upon a suitable part of the vehicle is, as shown in Figure 5, an appropriately located bell crank 23, to one arm of which the forward end of the rod is attached. Connected to the other arm of the bell crank is a rod 24 extending upwardly along the steering post and mounted upon the upper end portion of the steering post near the steering wheel is a hand lever 25 to which the rod is secured. Thus, as will be seen, the hand lever may be conveniently swung for actuating the valve 18. Preferably, a suitable check valve 26 is interposed in the pipe 17 to prevent a reduction of vacuum pressure in the cylinder 15 when the vehicle engine is accelerated or running at high speed.

Secured to the floor 13 of the vehicle at the lower side thereof is a bracket 27 and pivoted upon said bracket is a lever 28 to the lower end of which is attached a spring 29 extending forwardly from the lever and anchored to any convenient part of the vehicle. Thus, the spring will normally hold the lever in a forward position and connected with the lever is a piston 30 the rod 31 of which is attached to the lower end portion of the lever by a slot and pin connection, the piston being, of course, slidable in the cylinder 15. Rigidly attached to the lower end of the pedal 14 is a depending arm 32 and slidable through said arm is a rod 33 one end of which is secured to the lever 28 while at its opposite end the rod is formed with a head 34 for engagement by the arm.

Assuming the vehicle engine to be running, it will be seen, in view of the foregoing, that the valve 18 may, as shown in Figure 3, be opened, when the engine suction in the intake manifold 11 will be communicated to the cylinder 10 for exhausting the air therefrom and drawing the piston 30 rearwardly. Rearward movement of the piston will, of course, serve to swing the lever 28 rearwardly so that the head 34 of the rod 33 will be shifted into engagement with the arm 32 and said arm swung rearwardly for rocking the pedal 14 forwardly. Thus, the low speed clutch of the vehicle transmission will be actuated to render the low speed of the vehicle active and, as long as the valve 18 remains open, the pedal will, as will be appreciated, be held in its forward position. Thus, the driver will be relieved of the necessity of pushing against the pedal with the foot. When the valve 18 is then subsequently closed, as shown in Figure 4, air will be admitted to the cylinder 15 so that the spring 29 may function to retract the piston while the pedal 14 will be returned rearwardly under the influence of the high speed clutch spring which spring will, of course, function to render said clutch active. I thus provide a particularly simple and, at the same time, entirely efficient mechanism for actuating the low speed clutch pedal while, since the arm 32 may swing independently of the rod 33, the clutch pedal may, if desired, be operated by the foot in the customary way.

In Figure 6 of the drawings, I have illustrated a slight modification of the invention wherein the cylinder is indicated at 35, the piston rod at 36, the low speed clutch pedal at 37, and the arm upon said pedal at 38. In the present instance, I employ, in lieu of the rod 33, a cable or other approved flexible element 39 which is attached at one end to the piston rod 36 and at its opposite end is suitably anchored as to the cylinder 35, while the intermediate portion of said element is trained around a pulley 40 upon the arm 38. Thus, when the piston is moved rearwardly by engine suction, the pedal 37 will be swung forwardly.

In Figure 7 of the drawings, I have illustrated a still further modification wherein the cylinder is indicated at 41, the piston rod at 42, and the low speed clutch pedal at 43. Rigidly fixed upon the lower end of the pedal is an arm 44 terminating in a head 45 and pivoted adjacent the lower end of the pedal is a cam member 46 having an arm 47 connected with the piston rod 42 by a rod 48. Accordingly, when the piston is moved rearwardly by engine suction, the cam member 46 will be rocked to act against the head 45 of the arm 44 for swinging the pedal 43 forwardly. In other respects this modified form of the invention, as well as the previous modification described, is identical with the preferred construction.

Having thus described the invention, what I claim as new is:

1. The combination with a motor vehicle having a pedal, of a cylinder, a piston movable therein, a pipe connecting the cylinder with the intake manifold of the vehicle engine whereby when the engine is running air may be drawn from the cylinder and the piston shifted therein, a control valve interposed in said pipe, an operative connection between the piston and said pedal for rocking the pedal forwardly when the piston is shifted, and a check valve interposed in said pipe to prevent the reduction of vacuum pressure in the cylinder when the engine is accelerated.

2. The combination with a motor vehicle having a pedal, of a cylinder, a piston movable therein, a pipe connecting the cylinder with the intake manifold of the vehicle engine whereby when the engine is running air may be drawn from the cylinder and the piston shifted therein, a control valve interposed in said pipe, a lever pivoted upon the vehicle and connected with the piston, an arm fixed upon the pedal, and a rod forming a connection between said lever and arm whereby when the piston is shifted the pedal will be rocked forwardly.

3. The combination with a motor vehicle having a pedal, of a cylinder, a piston movable therein, a pipe connecting the cylinder with the intake manifold of the vehicle engine whereby when the engine is running air may be drawn from the cylinder and the piston shifted therein, a control valve interposed in said pipe, a lever pivoted upon the vehicle and connected with the piston, an arm fixed upon the pedal, a rod forming a connection between said lever and arm whereby when the piston is shifted the pedal will be rocked forwardly, and a spring associated with said lever for retracting the piston.

4. The combination with a motor vehicle having a pedal, of a cylinder, a piston movable therein, a pipe connecting the cylinder with the intake manifold of the vehicle engine whereby, when the engine is running, air may be drawn from the cylinder and the piston shifted therein, a control valve interposed in said pipe, a pivoted lever connected with the piston, an arm fixed upon the pedal, and means forming a connection between said lever and arm whereby when the piston is shifted the pedal will be rocked forwardly.

In testimony whereof I affix my signature.

JESSE J. MORSCH. [L. S.]